US012766862B2

(12) United States Patent
Ibaragi

(10) Patent No.: US 12,766,862 B2
(45) Date of Patent: Oct. 20, 2026

(54) SHEET DISCHARGER, AND SHEET POST-PROCESSING DEVICE AND IMAGE FORMING APPARATUS EACH INCLUDING THE SHEET DISCHARGER

(71) Applicant: KYOCERA Document Solutions Inc., Osaka (JP)

(72) Inventor: Hiromu Ibaragi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 110 days.

(21) Appl. No.: 18/981,042

(22) Filed: Dec. 13, 2024

(65) Prior Publication Data

US 2025/0206045 A1 Jun. 26, 2025

(30) Foreign Application Priority Data

Dec. 22, 2023 (JP) ................................ 2023-217110

(51) Int. Cl.
*B41J 13/00* (2006.01)
*B41J 13/10* (2006.01)

(52) U.S. Cl.
CPC ......... *B41J 13/106* (2013.01); *B41J 13/0036* (2013.01)

(58) Field of Classification Search
CPC ........................ B65H 2515/20; B65H 2220/02
See application file for complete search history.

(56) References Cited

U.S. PATENT DOCUMENTS

2013/0236228 A1 9/2013 Nagasako et al. ............ 399/405
2015/0253716 A1 9/2015 Nagasako et al.
2017/0113470 A1* 4/2017 Okazaki .................. B41J 11/04
2020/0122498 A1* 4/2020 Okada .................. G03G 21/206
2023/0257223 A1* 8/2023 Awaji .................. B65H 29/247

FOREIGN PATENT DOCUMENTS

JP 2013-184809 A 9/2013
JP 2022-025900 A 2/2022

OTHER PUBLICATIONS

Extended European Search Report dated Jun. 3, 2025, issued by the European Patent Office in corresponding application EP 24220749.6.

* cited by examiner

*Primary Examiner* — Ricardo I Magallanes
*Assistant Examiner* — Shlomit Chelst
(74) *Attorney, Agent, or Firm* — Stein IP, LLC

(57) ABSTRACT

A sheet discharger includes a sheet discharge outlet, a discharge member, a sheet discharge tray, and an air blowing mechanism. The discharge member conveys a sheet in a discharge direction. The sheet discharged through the sheet discharge outlet is loaded on the sheet discharge tray. The air blowing mechanism includes an air blowing port for blowing an air flow from upward to the sheet discharged through the sheet discharge outlet and an air blower that is connected to the air blowing port and generates the air flow. The air blowing port is provided above the sheet discharge outlet, at least a pair of air blowing ports is arranged at a middle in a width direction of the sheet orthogonal to the discharge direction, and the air flow is blown through the air blowing port diagonally downward from inside toward outside in the width direction of the sheet.

11 Claims, 6 Drawing Sheets

SHEET DISCHARGER, AND SHEET POST-PROCESSING DEVICE AND IMAGE FORMING APPARATUS EACH INCLUDING THE SHEET DISCHARGER

INCORPORATION BY REFERENCE

This application is based upon and claims the benefit of priority from the corresponding Japanese Patent Application No. 2023-217110 filed on Dec. 22, 2023, the entire contents of which are hereby incorporated by reference.

BACKGROUND

The present disclosure relates to a sheet discharger that discharges a sheet after being subjected to image formation by an image forming apparatus, and a sheet post-processing device and the image forming apparatus each including the sheet discharger.

An image forming apparatus such as a copy machine or a printer and a sheet post-processing device that performs post-processing on sheets are provided with a sheet discharger including a discharge roller pair and a discharge tray. A sheet (a sheet of paper) after being subjected to image formation by the image forming apparatus is discharged on the discharge tray by the sheet discharger provided in the image forming apparatus. Alternatively, after being carried into the sheet post-processing device and subjected to a prescribed type of post-processing thereon, the sheet is discharged on the discharge tray by the sheet discharger provided in the sheet post-processing device.

In the sheet discharger described above, discharging a largely curled sheet in its curled state might cause clogging of a sheet discharge outlet, resulting in a sheet discharge failure. To avoid this, a method has been adopted in which, using a fan, air is blown from above the sheet discharge outlet so as to stabilize sheet discharge.

SUMMARY

A sheet discharger according to an aspect of the present disclosure includes a sheet discharge outlet, a discharge member, a sheet discharge tray, and an air blowing mechanism. A sheet is discharged through the sheet discharge outlet. The discharge member is arranged at the sheet discharge outlet and conveys the sheet in a discharge direction. The sheet discharge tray is arranged downstream of the sheet discharge outlet in the discharge direction, and the sheet discharged through the sheet discharge outlet is loaded on the sheet discharge tray. The air blowing mechanism blows an air flow to the sheet discharged through the sheet discharge outlet. The air blowing mechanism includes an air blowing port for blowing the air flow from upward to the sheet discharged through the sheet discharge outlet and an air blower that is connected to the air blowing port and generates the air flow. The air blowing port is provided above the sheet discharge outlet, at least a pair of air blowing ports is arranged at a middle in a width direction of the sheet orthogonal to the discharge direction, and the air flow is blown through the air blowing port diagonally downward from inside toward outside in the width direction of the sheet.

DETAILED DESCRIPTION

[1. Configuration of Image Forming System]

Figure 1:
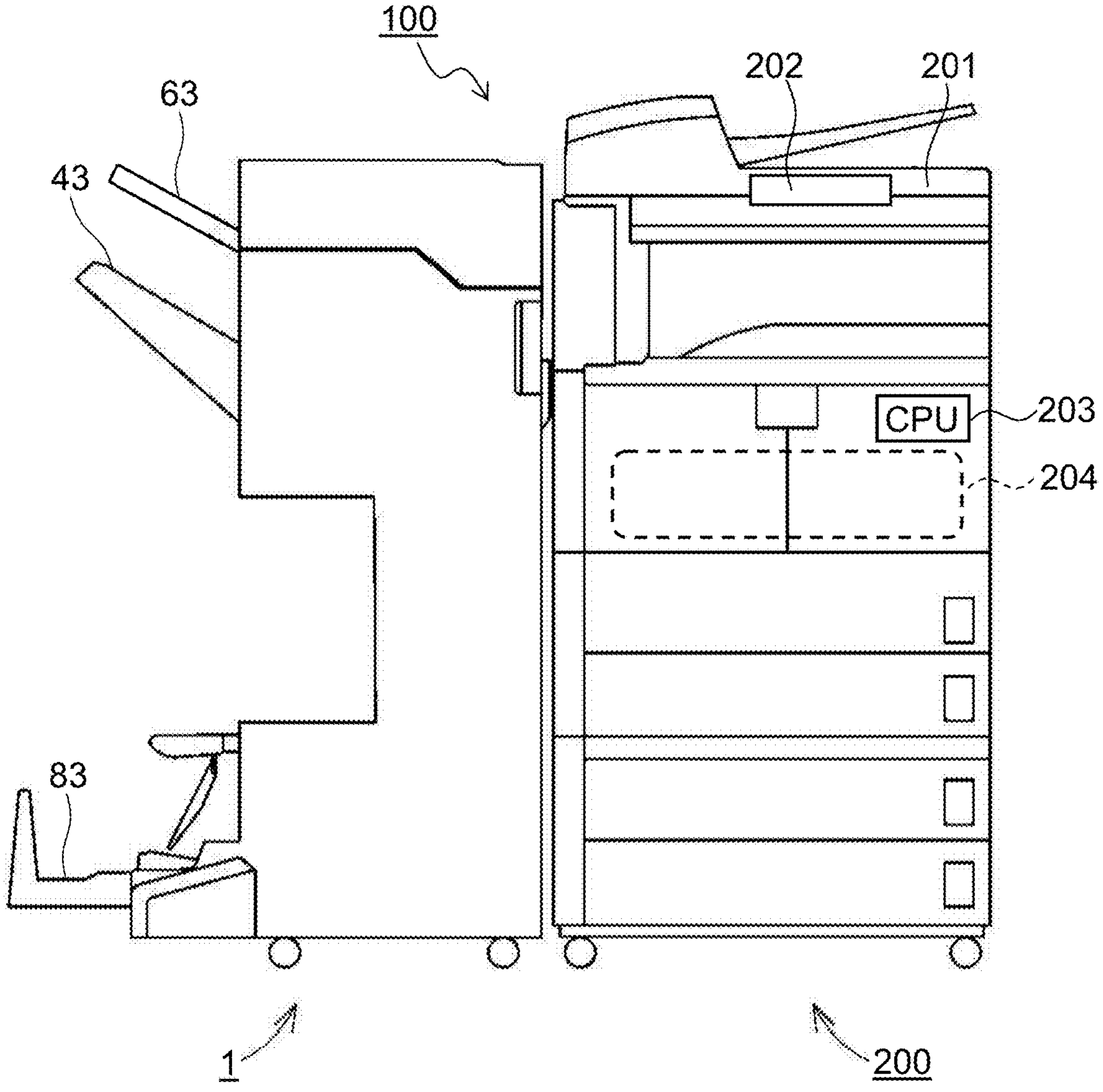
FIG. 1 is a schematic view showing a configuration of an image forming system composed of a sheet post-processing device according to one embodiment of the present disclosure and an image forming apparatus to which the sheet post-processing device is connected.

With reference to the appended drawings, the following describes an embodiment of the present disclosure in detail. FIG. 1 is a schematic view showing a configuration of an image forming system 100 composed of a sheet post-processing device 1 according to one embodiment of the present disclosure and an image forming apparatus 200 to which the sheet post-processing device 1 is connected.

As shown in FIG. 1, based on image data externally inputted via an unshown network communication portion or image data read by an image reading portion 201 arranged in an upper part of the image forming apparatus 200, the image forming apparatus 200 performs printing of an image on a sheet (a sheet of paper) by means of an image forming portion 204. In this embodiment, the image forming apparatus 200 is an inkjet recording apparatus in which the image forming portion 204 includes recording heads (not shown) of different colors each having a multitude of nozzle orifices for ejecting ink to the sheet.

An operation panel 202 is arranged in front of the image reading portion 201. The operation panel 202 is an operation portion for accepting inputs of various types of settings. For example, by operating the operation panel 202, a user can input size information on the sheet. Furthermore, by operating the operation panel 202, it is also possible to input the number of sheets to be subjected to printing or an instruction to start a printing job. A main body control portion 203 performs centralized control of operations of the image forming apparatus 200 as a whole and controls the various portions of the image forming apparatus 200.

The sheet post-processing device 1 is detachably connected to a side surface of the image forming apparatus 200. The sheet post-processing device 1 performs post-processing such as a punch hole forming process or a binding process on the sheets after being subjected to image formation (printing) by the image forming apparatus 200. The sheet post-processing device 1 is not limited to performing post-processing on the sheet automatically conveyed from the image forming apparatus 200 but may also perform post-processing on the sheet placed on an unshown tray by a user and conveyed by the sheet post-processing device 1 itself to a position at which the post-processing can be performed.

[2. Configuration of Sheet Post-Processing Device]

Figure 2:
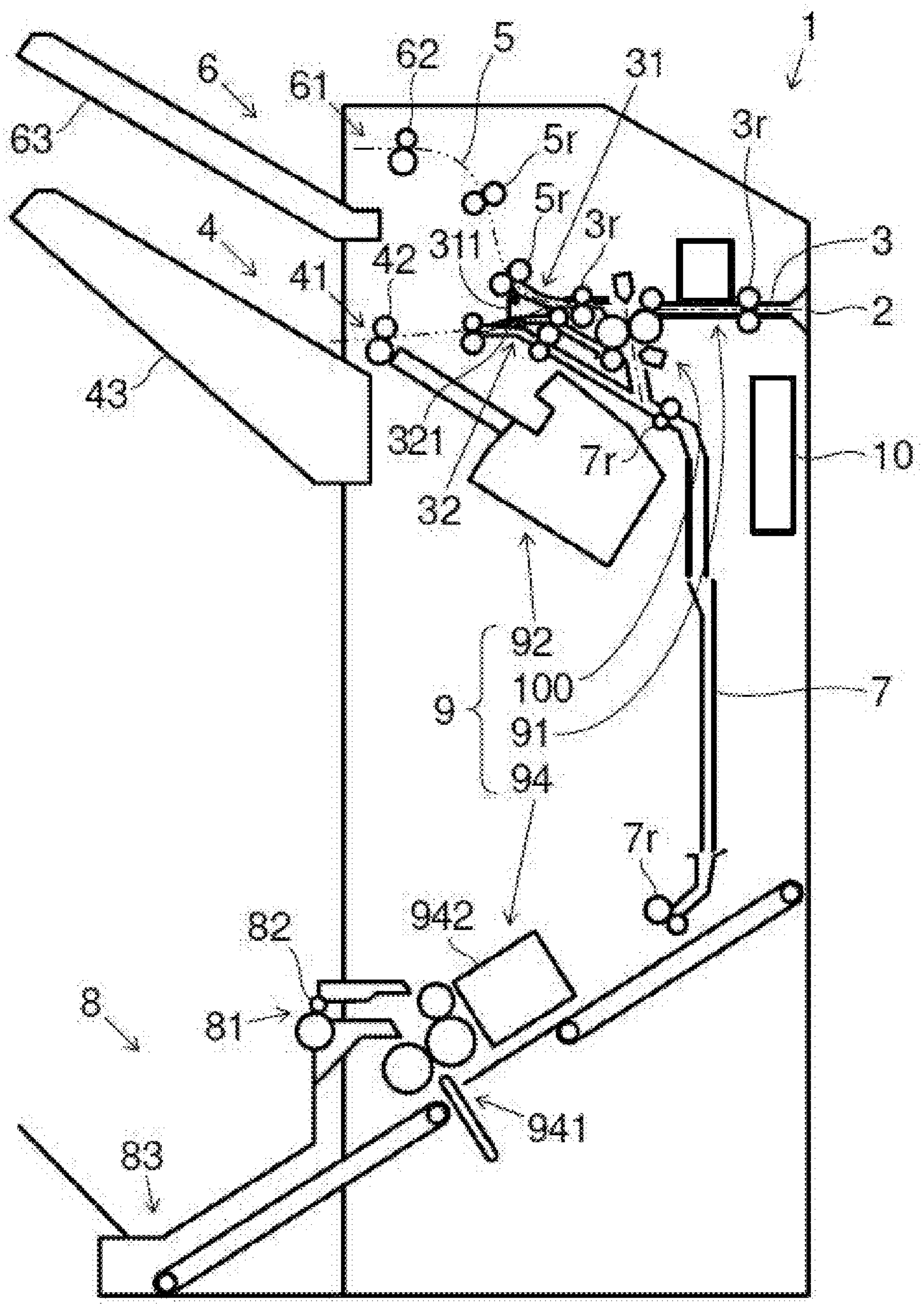
FIG. 2 is a sectional side view schematically showing a configuration of the sheet post-processing device according to the embodiment.

FIG. 2 is a sectional side view schematically showing a configuration of the sheet post-processing device 1 according to this embodiment. As shown in FIG. 2, the sheet post-processing device 1 includes a sheet carry-in inlet 2, a first sheet conveyance path 3, a first sheet discharge portion 4, a second sheet conveyance path 5, a second sheet discharge portion 6, a third sheet conveyance path 7, a third sheet discharge portion 8, a post-processing section 9, and a post-processing control portion (a control portion) 10.

The sheet carry-in inlet 2 is an opening provided in a side surface of the sheet post-processing device 1 opposed to the image forming apparatus 200. The sheet being conveyed from the image forming apparatus 200 toward the sheet post-processing device 1 passes through the sheet carry-in inlet 2 to be carried into the sheet post-processing device 1.

The first sheet conveyance path 3 extends substantially horizontally from the sheet carry-in inlet 2 to the first sheet discharge portion 4 in a direction away from the image forming apparatus 200 (a leftward direction in FIG. 2). A direction directed from the sheet carry-in inlet 2 toward the first sheet discharge portion 4 is referred to as a sheet conveyance direction on the first sheet conveyance path 3. The sheet carry-in inlet 2 is positioned at an upstream end of the first sheet conveyance path 3 in the sheet conveyance direction. The first sheet conveyance path 3 includes a plurality of conveyance roller pairs **3*r* and conveys, toward downstream in the sheet conveyance direction, the sheet carried into the sheet post-processing device 1 through the sheet carry-in inlet 2**.

The first sheet discharge portion 4 is provided on a side surface of the sheet post-processing device 1 opposite to the side surface thereof opposed to the image forming apparatus 200. The first sheet discharge portion 4 is arranged at a downstream end of the first sheet conveyance path 3 in the sheet conveyance direction. The first sheet discharge portion 4 includes a first discharge outlet 41, a first discharge roller pair 42, and a first discharge tray 43.

The first discharge outlet 41 is positioned at the downstream end of the first sheet conveyance path 3 in the sheet conveyance direction. The first discharge roller pair 42 is arranged at the first discharge outlet 41. The first discharge tray 43 is positioned downstream of the first discharge outlet 41 in the sheet conveyance direction. The sheet that has been conveyed on the first sheet conveyance path 3 to reach the first discharge outlet 41 is passed through the first discharge outlet 41 by the first discharge roller pair 42 so as to be discharged on the first discharge tray 43. The first discharge tray 43 is one of locations at which the sheet that has been subjected to post-processing by the sheet post-processing device 1 is eventually discharged.

The second sheet conveyance path 5 branches off from a first branch portion (a branch portion) 31 on the first sheet conveyance path 3 to extend laterally in the direction away from the image forming apparatus 200 (the leftward direction in FIG. 2) and upwardly to the second sheet discharge portion 6. The first branch portion 31 is arranged downstream of a perforation portion 91 in the sheet conveyance direction on the first sheet conveyance path 3. A direction directed from the first branch portion 31 toward the second sheet discharge portion 6 is referred to as a sheet conveyance direction on the second sheet conveyance path 5. The first branch portion 31 is positioned at an upstream end of the second sheet conveyance path 5 in the sheet conveyance direction. The second sheet conveyance path 5 includes a plurality of conveyance roller pairs **5*r* and conveys the sheet being conveyed on the first sheet conveyance path 3 so that a conveyance direction of the sheet is changed at the first branch portion 31 toward the second sheet discharge portion 6**.

The first branch portion 31 includes a first switching guide 311. The first switching guide 311 pivots to a position at which the sheet being conveyed on the first sheet conveyance path 3 from the sheet carry-in inlet 2 is guided to the first discharge outlet 41 along the first sheet conveyance path 3 and to a position at which the conveyance direction of the sheet is changed from that on the first sheet conveyance path 3 so that the sheet is guided to the second sheet conveyance path 5. The first switching guide 311 further pivots to a position at which the sheet that has been subjected to a folding process and has passed through a folding conveyance path (not shown) is guided to the second sheet conveyance path 5. The first switching guide 311 is connected to a drive mechanism (not shown), and an operation thereof is controlled by the post-processing control portion 10.

The second sheet discharge portion 6 is provided on the side surface of the sheet post-processing device 1 opposite to the side surface thereof opposed to the image forming apparatus 200 and above the first sheet discharge portion 4. The second sheet discharge portion 6 is arranged at a downstream end of the second sheet conveyance path 5 in the sheet conveyance direction. The second sheet discharge portion 6 includes a second discharge outlet 61, a second discharge roller pair 62, and a second discharge tray 63.

The second discharge outlet 61 is positioned at the downstream end of the second sheet conveyance path 5 in the sheet conveyance direction. The second discharge roller pair 62 is arranged at the second discharge outlet 61. The second discharge tray 63 is positioned downstream of the second discharge outlet 61 in the sheet conveyance direction. The sheet that has been conveyed on the second sheet conveyance path 5 to reach the second discharge outlet 61 is passed through the second discharge outlet 61 by the second discharge roller pair 62 so as to be discharged on the second discharge tray 63. The second discharge tray 63 is one of the locations at which the sheet that has been subjected to post-processing by the sheet post-processing device 1 is eventually discharged. Furthermore, a sheet not to be subjected to post-processing, a small-sized sheet, and so on are also discharged on the second discharge tray 63.

The third sheet conveyance path 7 branches off from a second branch portion 32 on the first sheet conveyance path 3 to extend downward to the third sheet discharge portion 8. A direction directed from the second branch portion 32 toward the third sheet discharge portion 8 is referred to as a sheet conveyance direction on the third sheet conveyance path 7. The second branch portion 32 is positioned downstream of the first branch portion 31 in the sheet conveyance direction on the first sheet conveyance path 3 and at an upstream end of the third sheet conveyance path 7 in the sheet conveyance direction. The third sheet conveyance path 7 includes a plurality of conveyance roller pairs **7*r* and conveys the sheet being conveyed on the first sheet conveyance path 3 so that the conveyance direction of the sheet is changed at the second branch portion 32 toward the third sheet discharge portion 8**.

The second branch portion 32 includes a second switching guide 321. The second switching guide 321 pivots to a position at which the sheet being conveyed on the first sheet conveyance path 3 from the sheet carry-in inlet 2 is guided to the first discharge outlet 41 along the first sheet conveyance path 3 and to a position at which the sheet that has been conveyed on the first sheet conveyance path 3 from the sheet carry-in inlet 2 and has passed through the second branch portion 32 so as then to be switched back is guided to the third sheet conveyance path 7. The second switching guide 321 is connected to a drive mechanism (not shown), and an operation thereof is controlled by the post-processing control portion 10.

The third sheet discharge portion 8 is provided on the side surface of the sheet post-processing device 1 opposite to the side surface thereof opposed to the image forming apparatus 200 and below the first sheet discharge portion 4 (near a lower end of the sheet post-processing device 1). The third sheet discharge portion 8 includes a third discharge outlet 81, a third discharge roller pair 82, and a third discharge tray 83.

The third discharge outlet 81 is positioned at a downstream end of the third sheet conveyance path 7 in the sheet conveyance direction. The third discharge roller pair 82 is arranged at the third discharge outlet 81. The third discharge tray 83 is positioned downstream of the third discharge outlet 81 in the sheet conveyance direction. The sheet that has been conveyed on the third sheet conveyance path 7 to reach the third discharge outlet 81 is passed through the third discharge outlet 81 by the third discharge roller pair 82 so as to be discharged on the third discharge tray 83. The third discharge tray 83 is one of the locations at which the sheet that has been subjected to post-processing by the sheet post-processing device 1 is eventually discharged.

The post-processing section 9 performs a prescribed type of post-processing on the sheet that has been subjected to image formation by the image forming apparatus 200 and carried into the sheet post-processing device 1. The post-processing section 9 includes the perforation portion 91, a sheet binding unit 92, a sheet folding unit 100, and a bookbinding portion 94.

The perforation portion 91 is arranged in immediate proximity to and downstream of the sheet carry-in inlet 2 on the first sheet conveyance path 3. The perforation portion 91 performs a perforation process on the sheet being conveyed on the first sheet conveyance path 3 so as to form a punch hole therein.

The sheet binding unit 92 is arranged in immediate proximity to and upstream of the first sheet discharge portion 4 in the sheet conveyance direction on the first sheet conveyance path 3. The sheet binding unit 92 performs a stapling process (the binding process) on a sheet bundle of a plurality of sheets stacked on each other so as to bind the sheet bundle. A detailed configuration of the sheet binding unit 92 will be described later.

The sheet folding unit 100 is arranged downstream of the perforation portion 91 and upstream of the sheet binding unit 92 in the sheet conveyance direction on the first sheet conveyance path 3. The sheet folding unit 100 performs the folding process on a single sheet so as to form a fold line on the sheet. The sheet folding unit 100 is capable of performing, on a single sheet, the folding process for folding the sheet, for example, in two, in a Z shape, outwardly in three, or inwardly in three.

The bookbinding portion 94 is arranged in immediate proximity to and upstream of the third sheet discharge portion 8 in the sheet conveyance direction on the third sheet conveyance path 7. The bookbinding portion 94 includes a center-folding part 941 and a center-binding part 942. The bookbinding portion 94 performs, on a sheet bundle of a plurality of sheets stacked on each other, a center-folding process and a center-binding process in which the sheet bundle is folded at substantially a center thereof in the sheet conveyance direction and bound into a booklet.

The post-processing control portion (the control portion) 10 includes a CPU, a storage part, and other electronic circuits and electronic components (none of which are shown). The post-processing control portion 10 is communicably connected to the main body control portion 203 (see FIG. 1) in the image forming apparatus 200. Upon receipt of an instruction from the main body control portion 203, based on control programs and data stored in the storage part, the post-processing control portion 10 controls, by use of the CPU, operations of the various constituent elements provided in the sheet post-processing device 1 so as to perform processing related to functions of the sheet post-processing device 1. The first sheet conveyance path 3, the first sheet discharge portion 4, the second sheet conveyance path 5, the second sheet discharge portion 6, the third sheet conveyance path 7, the third sheet discharge portion 8, and the post-processing section 9 individually receive instructions from the post-processing control portion 10 and perform post-processing on the sheet in conjunction with each other. A configuration may be adopted in which the main body control portion 203 in the image forming apparatus 200 also assumes functions of the post-processing control portion 10.

[3. Configuration of First Sheet Discharge Portion]

Figure 3:
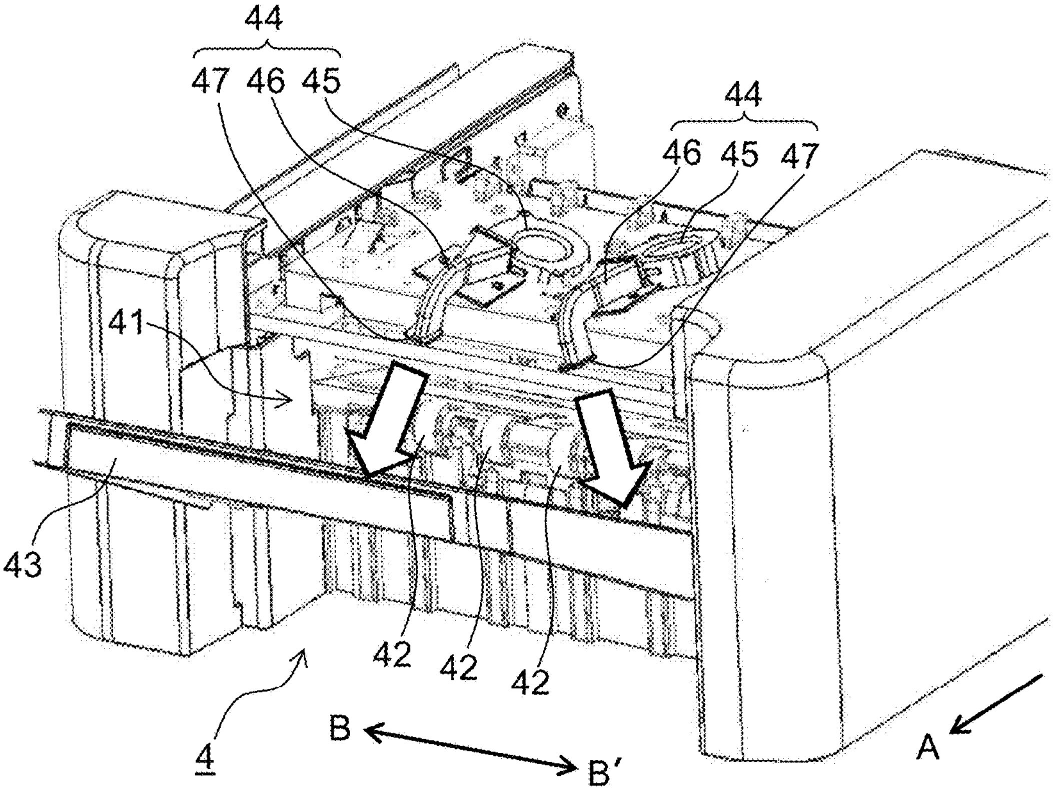
FIG. 3 is a perspective view of and around a first sheet discharge portion of the sheet post-processing device according to the embodiment.
Figure 4:
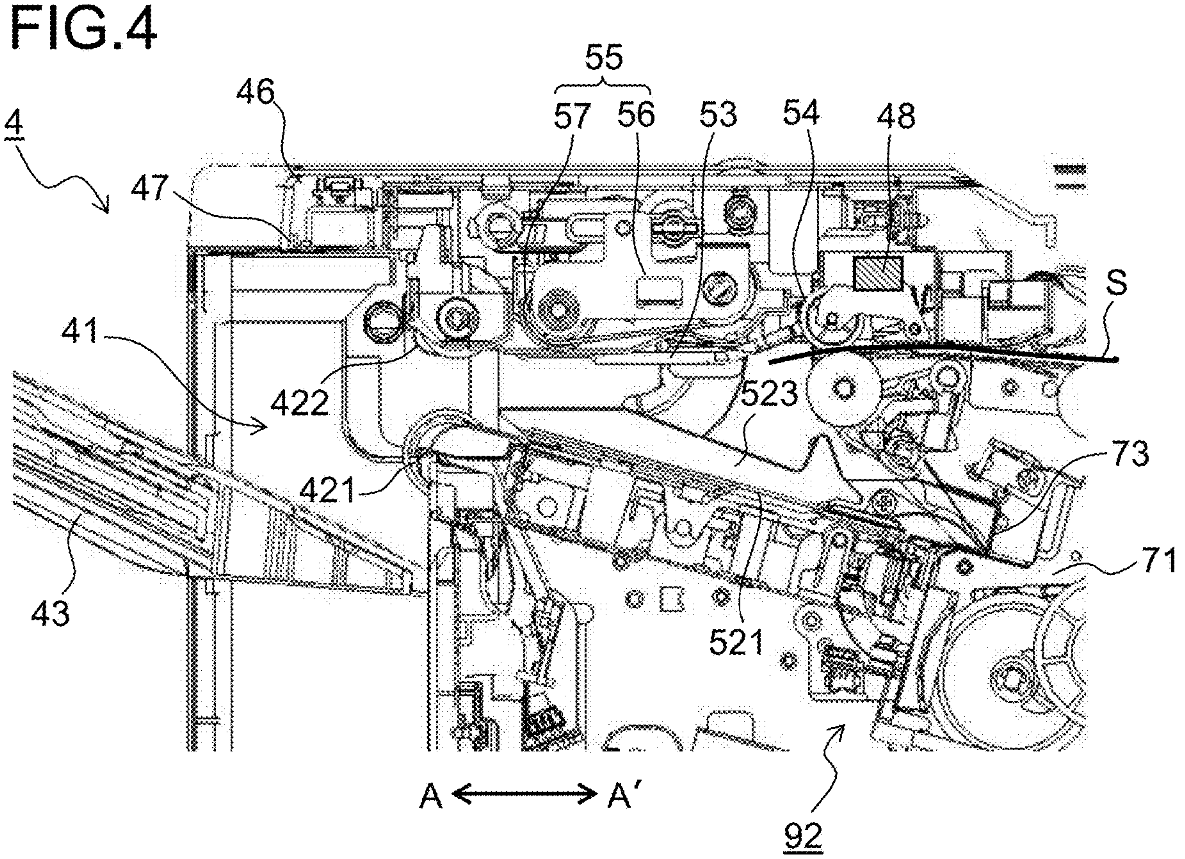
FIG. 4 is a sectional side view of and around the first sheet discharge portion of the sheet post-processing device according to the embodiment.
Figure 5:
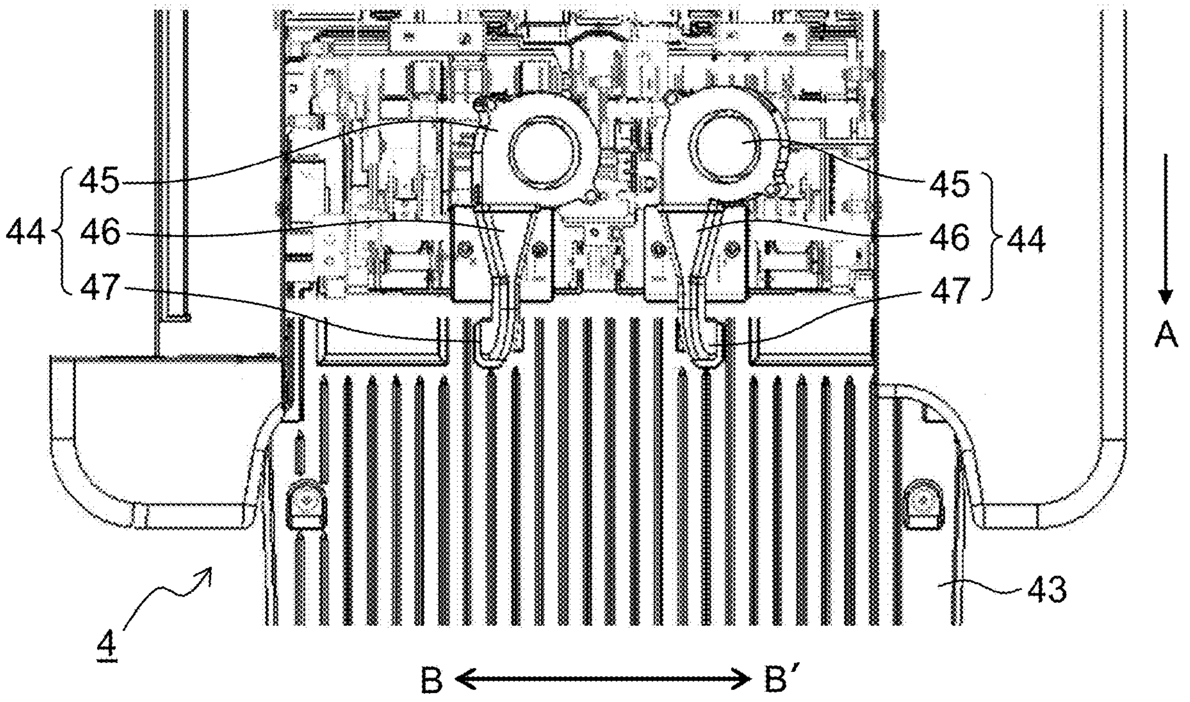
FIG. 5 is a plan view, as seen from above, of and around the first sheet discharge portion of the sheet post-processing device according to the embodiment.

Next, a description is given of a configuration of and around the first sheet discharge portion 4. FIG. 3 is a perspective view of and around the first sheet discharge portion 4. FIG. 4 is a sectional side view of and around the first sheet discharge portion 4. FIG. 5 is a plan view, as seen from above, of and around the first sheet discharge portion 4. As shown in FIG. 3, the first sheet discharge portion 4 (a sheet discharger) includes an air blowing mechanism 44 in addition to the first discharge outlet 41, the first discharge roller pair 42, and the first discharge tray 43, which are described earlier. The air blowing mechanism 44 includes an air blower 45, an air blowing duct 46, and an air blowing port 47.

A pair of air blowers 45 is arranged above the first discharge outlet 41 and upstream of the first discharge outlet 41 in a sheet discharge direction (a direction of an arrow A). In this embodiment, a sirocco fan is used as the air blower 45.

The air blowing duct 46 is connected to each of the pair of air blowers 45. The air blowing ducts 46 as a pair each extend, in the sheet discharge direction, toward above the first discharge outlet 41 and have a distal end bent downward. One end of the air blowing duct 46 (an upstream end thereof in the sheet discharge direction) is connected to a blowoff port of the air blower 45. The air blowing port 47 is formed at the other end of the air blowing duct 46 (a downstream end thereof in the sheet discharge direction). The air blowing port 47 is arranged within a width of a minimum-sized sheet discharged to the first discharge tray 43 in a sheet width direction.

As shown in FIG. 4, the sheet binding unit 92 is arranged upstream of the first sheet discharge portion 4 (on a right side in FIG. 4) in the sheet discharge direction (the direction of the arrow A). The sheet binding unit 92 includes a processing tray 521, a stapling portion 71, and a reference plate 73.

The processing tray 521 is a rectangular tray extending in the sheet discharge direction (the direction of the arrow A) and in the sheet width direction (a direction of arrows B and B'). A plurality of sheets (a sheet bundle) to be subjected to the stapling process are loaded on the processing tray 521. By a carry-in roller pair 54, a sheet S is carried in the same direction (a carry-in direction, the direction of the arrow A) as the discharge direction onto the processing tray 521. By the first discharge roller pair 42, the sheet bundle that has been subjected to the stapling process is fed out in the sheet discharge direction so as to be discharged to the first discharge tray 43.

The processing tray 521 includes a width regulation member 523. A pair of width regulation members 523 is arranged in the sheet width direction. The pair of width regulation members 523 is reciprocatable in the sheet width direction along an upper surface of the processing tray 521 via a drive mechanism (not shown) such as a rack and a pinion gear. In this embodiment, every time the sheet S is carried onto the processing tray 521, the pair of width regulation members 523 is driven to reciprocate by the drive mechanism. As a result, the sheet S carried onto the processing tray 521 is positionally aligned in the sheet width direction.

The stapling portion 71 is arranged to be opposed to an end edge of the sheet S downstream (on the right side in FIG. 4) in an alignment direction (a direction of an arrow A') opposite to the carry-in direction. The stapling portion 71 is movable in the sheet width direction (the direction of the arrows B and B') along the end edge of the sheet S by a drive force of a motor (not shown) and performs the stapling process on a bundle of sheets S.

The reference plate 73 is secured to the processing tray 521 so as to be opposed to an end of the processing tray 521 downstream (on the right side in FIG. 4) in the alignment direction. As seen in a cross section orthogonal to the sheet width direction, the reference plate 73 is in substantially a U shape open upstream (on a left side in FIG. 4) in the alignment direction. The reference plate 73 abuts on the end edge of the sheet S carried onto the processing tray 521 so as to align the sheet S in the alignment direction (the direction of the arrow A').

The carry-in roller pair 54 is arranged above the processing tray 521. A sheet sensor 48 is arranged in a vicinity of the carry-in roller pair 54. The sheet sensor 48 senses a timing when the sheet S passes through the carry-in roller pair 54. As the sheet sensor 48, there is used, for example, a PI (photo-interrupter) sensor including a sensing portion composed of a light-emitting part and a light-receiving part.

A tapping member 53 and an alignment member 55 are provided downstream of the carry-in roller pair 54 (on the left side in FIG. 4) in the carry-in direction of the sheet S. The tapping member 53 is supported so as to be swingable along the carry-in direction of the sheet S. At a timing when a trailing end of the sheet S passes through the carry-in roller pair 54, the tapping member 53 swings downward to tap the sheet S downward so that the sheet S is aligned along the processing tray 521.

The alignment member 55 is arranged at each of a plurality of locations (four locations in this embodiment) along the sheet width direction (a direction perpendicular to a plane of FIG. 4). The alignment member 55 assists in aligning the sheet S carried onto the processing tray 521 by moving (switching back) the sheet S in the alignment direction toward the reference plate 73. The alignment member 55 includes a paddle holder 56 and an alignment paddle 57.

The paddle holder 56 is supported at a lower end of a conveyance frame (not shown) so as to be swingable along the carry-in direction of the sheet S. By a paddle drive motor (not shown), a rotation drive force is inputted to a swing shaft of the paddle holder 56. By a drive source (not shown) such as a motor, a rotation drive force in a direction for sending out the sheet S in the alignment direction (counterclockwise in FIG. 4) is inputted to the alignment paddle 57. While abutting on an upper surface of the sheet S carried onto the processing tray 521, the alignment paddle 57 rotates to move the sheet S in the alignment direction so that the end edge of the sheet S strikes the reference plate 73, thus aligning the sheet S.

Swinging of the paddle holder 56 is controlled based on a sensing timing of the sheet sensor 48. Specifically, at a timing when the sheet sensor 48 senses passing of a leading end of the sheet S through the carry-in roller pair 54, the paddle holder 56 is swung upward. As a result, the alignment paddle 57 is separated from the upper surface of the processing tray 521 (or of the sheet S loaded on the processing tray 521).

FIG. 4 shows a state immediately before a new sheet S is carried onto the processing tray 521 in which the paddle holder 56 is swung upward (clockwise) and the alignment paddle 57 is arranged at a position (a reference position) separated from the processing tray 521. Furthermore, a nip is released between a lower discharge roller 421 and an upper discharge roller 422, which constitute the first discharge roller pair 42. Thus, the sheet S that has been carried through the carry-in roller pair 54 onto the processing tray 521 once passes through the first discharge roller pair 42 to project over the first discharge tray 43.

Further, by the tapping member 53, the new sheet S carried onto the processing tray 521 is tapped at a trailing end thereof so as to be aligned along the processing tray 521, and then the paddle holder 56 is swung by a prescribed amount in a reverse direction (counterclockwise). As a result, the alignment paddle 57 is arranged at a position (an acting position) at which it contacts an upper surface of the sheet S. When the alignment paddle 57 is rotated in this state, the sheet S is drawn in the alignment direction (the direction of the arrow A') along the processing tray 521. Every time the sheet S is carried in, the above-described operation is repeatedly performed, and thus it is possible to reliably cause the alignment paddle 57 to contact the upper surface of the sheet S while avoiding interference between the leading end of the sheet S carried onto the processing tray 521 and the alignment paddle 57.

After that, the sheet S is sent further downstream in the alignment direction by the alignment paddle 57, aligned in the sheet width direction by the width regulation member 523, and aligned in the carry-in direction by the reference plate 73, thus being loaded in that state.

In performing the stapling process on the sheets S carried onto the processing tray 521, after the stapling portion 71 has moved to a prescribed stapling position, the post-processing control portion 10 transmits a control signal to the stapling portion 71 so that the stapling process is executed on a plurality of sheets S aligned by the reference plate 73. The post-processing control portion 10 controls the rollers constituting the first discharge roller pair 42 to contact each other (form a nip) and the first discharge roller pair 42 to rotate in the discharge direction. In this way, a bundle of sheets S that has been subjected to the stapling process is discharged to the first discharge tray 43 by the first discharge roller pair 42.

In performing a sorting process (a shifting process) on the sheet S carried onto the processing tray 521, every time a prescribed number of sheets S are carried onto the processing tray 521, the post-processing control portion 10 controls the pair of width regulation members 523 to move in a direction for shifting the sheet S. In this way, the sheets S are discharged in a sorted state to a plurality of positions on the first discharge tray 43. Furthermore, the post-processing control portion 10 is also capable of performing control so that the sheets S carried onto the processing tray 521 are discharged on the first discharge tray 43 without being subjected to the stapling process and the sorting process.

[4. Operation by Air Blowing Mechanism to Assist in Sheet Discharge to First Discharge Tray]

Next, a description is given of an operation by the air blowing mechanism 44 to assist in sheet discharge to the first discharge tray 43. The sheet discharge assist operation by the air blowing mechanism 44 is executed in the case of discharging the sheets S in a sorted state to the first discharge tray 43 or in the case of discharging the sheets S on the first discharge tray 43 without them being subjected to the stapling process and the sorting process. In the case of discharging a bundle of sheets S that has been subjected to the stapling process on the first discharge tray 43, the sheets S are prevented from being curled to cause trouble, and thus there is no need to perform the sheet discharge assist operation.

Figure 6:
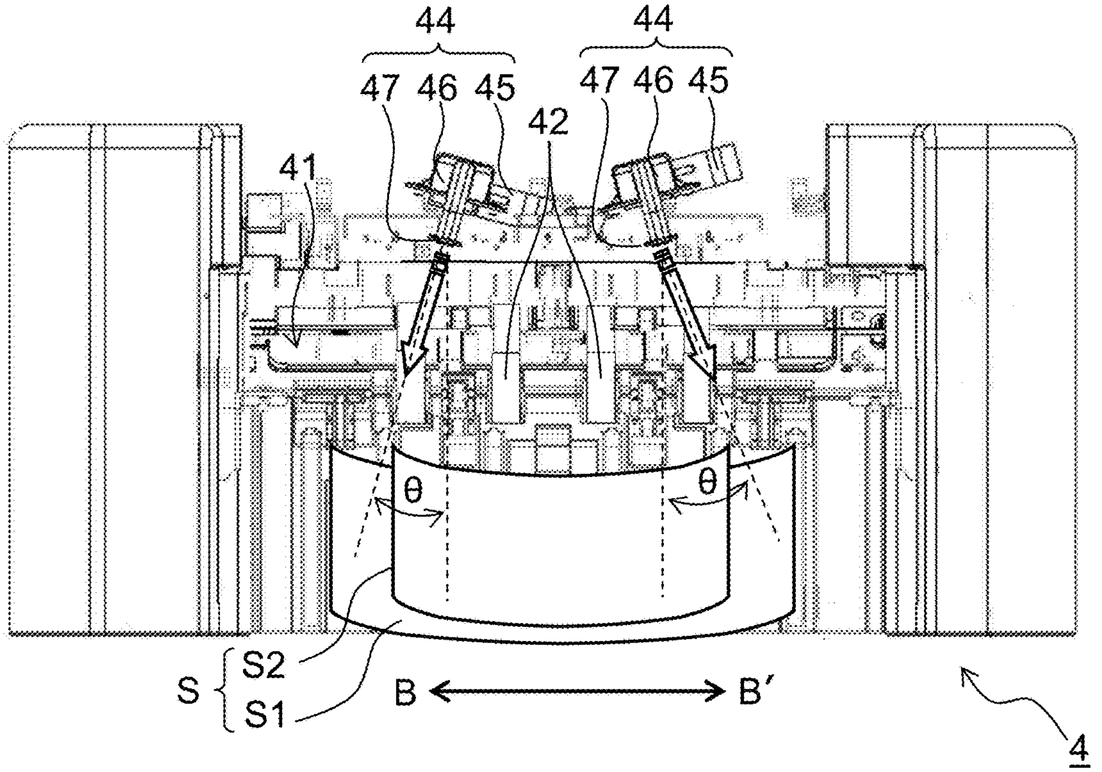
FIG. 6 is a front view of how sheets are discharged to the first sheet discharge portion as seen from downstream in a discharge direction.

FIG. 6 is a front view of how the sheets S are discharged to the first sheet discharge portion 4 as seen from downstream in the discharge direction. In FIG. 6, the first discharge tray 43 is omitted from illustration. An air flow generated by the air blower 45 passes through the air blowing duct 46 to be blown downward through the air blowing port 47 toward the sheet S discharged to the first discharge tray 43.

To be more specific, the air blowing mechanism 44 blows air flows diagonally downward (in directions of hollow arrows in FIGS. 3 and 6) from inside toward outside in a width direction of the sheet S through a pair of air blowing ports 47 provided at a middle in the width direction of the sheet S. The air blowing mechanism 44 blows air flows to regions outside side end edges of a minimum-sized sheet S discharged through the first discharge outlet 41 in the width direction.

According to the above-described configuration, curling of the sheet S at both ends thereof in the width direction can be suppressed with air flows, and thus it is possible to enhance loadability and dischargeability of the sheet S on the first discharge tray 43. Particularly in a case where, as in this embodiment, the image forming apparatus 200 connected to the sheet post-processing device 1 is an inkjet recording apparatus, the sheet S being discharged tends to be largely curled; even in such a case, however, the sheet S can be stably discharged to be loaded.

When a blowing angle (an angle formed with a vertical direction taken as 0 degrees) of an air flow blown through the air blowing port 47 is too small, the air flow is not sufficiently blown to each of both ends of a large-sized sheet S1 in a width direction thereof. When, on the other hand, the blowing angle of the air flow blown through the air blowing port 47 is too large, the air flow is blown to outside each of both ends of a small-sized sheet S2 in a width direction thereof. A blowing angle θ of an air flow blown through the air blowing port 47 is set preferably to 15° to 20°.

Furthermore, the blowing angle θ may be made variable depending on a size of the sheet S in the width direction. Specifically, the air blowing duct 46 is configured to be variable in inclination so that a user manually adjusts the inclination thereof depending on the size of the sheet S in the width direction. Alternatively, a configuration may be adopted in which there is provided a drive mechanism for varying the inclination of the air blowing duct 46, and the post-processing control portion 10 performs control so that the inclination of the air blowing duct 46 is automatically adjusted based on size information on the sheet S inputted from the main body control portion 203 or the like. Thus, regardless of the size of the sheet S in the width direction, curling of the sheet S at both the ends thereof in the width direction can be effectively suppressed.

Furthermore, in this embodiment, until the leading end of the sheet S discharged by the first discharge roller pair 42 contacts the first discharge tray 43 (or a sheet S loaded on the first discharge tray 43), air blowing by the air blowing mechanism 44 is kept halted, and at or after a timing T1 when the leading end of the sheet S contacts the first discharge tray 43 (or the sheet S loaded on the first discharge tray 43), the air blowing by the air blowing mechanism 44 is started. The timing T1 is calculated based on a sensing timing (a sensing signal) of sensing the leading end of the sheet S transmitted from the sheet sensor 48 (see FIG. 4) and a discharge speed of the sheet S.

Specifically, in response to transmission of the sensing timing (the sensing signal) of sensing the leading end of the sheet S from the sheet sensor 48 (see FIG. 4), the post-processing control portion 10 determines whether or not a prescribed time period T has elapsed from the sensing timing. Further, when the prescribed time period T has elapsed, it is determined that the leading end of the sheet S has contacted the first discharge tray 43 (or the sheet S loaded on the first discharge tray 43), and thus a control signal is transmitted to the air blower 45 so that air blowing is started.

Further, at a timing T2 when the trailing end of the sheet S contacts the first discharge tray 43 (or the sheet S loaded on the first discharge tray 43), the air blowing is halted. Similarly to the timing T1, the timing T2 is calculated based on a sensing timing (a sensing signal) of sensing the trailing end of the sheet S transmitted from the sheet sensor 48 (see FIG. 4) and the discharge speed of the sheet S.

By starting and halting air blowing at the above-described timings, it is possible to blow an air flow concentratedly to the trailing end of the sheet S in the discharge direction where the sheet S is likely to be curled, while suppressing fluttering of the sheet S at the leading end thereof in the discharge direction due to the air blowing. As a result, it is possible to stably discharge the sheet S through the first discharge outlet 41 and to load the sheet S on the first discharge tray 43 while effectively suppressing curling of it at both the ends thereof in the width direction.

Furthermore, in a case of continuously discharging the sheet S through the first discharge outlet 41 to the first discharge tray 43, the air blower 45 is repeatedly turned on and off at the above-described timings every time one sheet S is discharged, and when the air blower 45 is switched from an off state to an on state, there occurs a time lag until an air flow attains a target air velocity. This results in instability of an air velocity of an air flow blown to the sheet S, rendering an effect of suppressing curling of the sheet S insufficient.

To avoid the above situation, in the case of continuously discharging the sheet S through the first discharge outlet 41, the air blower 45 is driven at a reference speed (a first speed) during discharge of the sheet S and at a speed (a second speed) lower than the reference speed during a period (an inter-sheet interval) after the discharge of the sheet S until a succeeding sheet S is discharged through the first discharge outlet 41.

By adopting this configuration, compared with the case where the air blower 45 is repeatedly turned on and off, an air velocity of an air flow from the air blower 45 can be more stably increased to a target air velocity. Furthermore, since the air velocity is decreased during the period after discharge of a preceding sheet S until a succeeding sheet S is discharged, it is also possible to suppress fluttering of the succeeding sheet S at a leading end thereof in the discharge direction.

Figure 7:
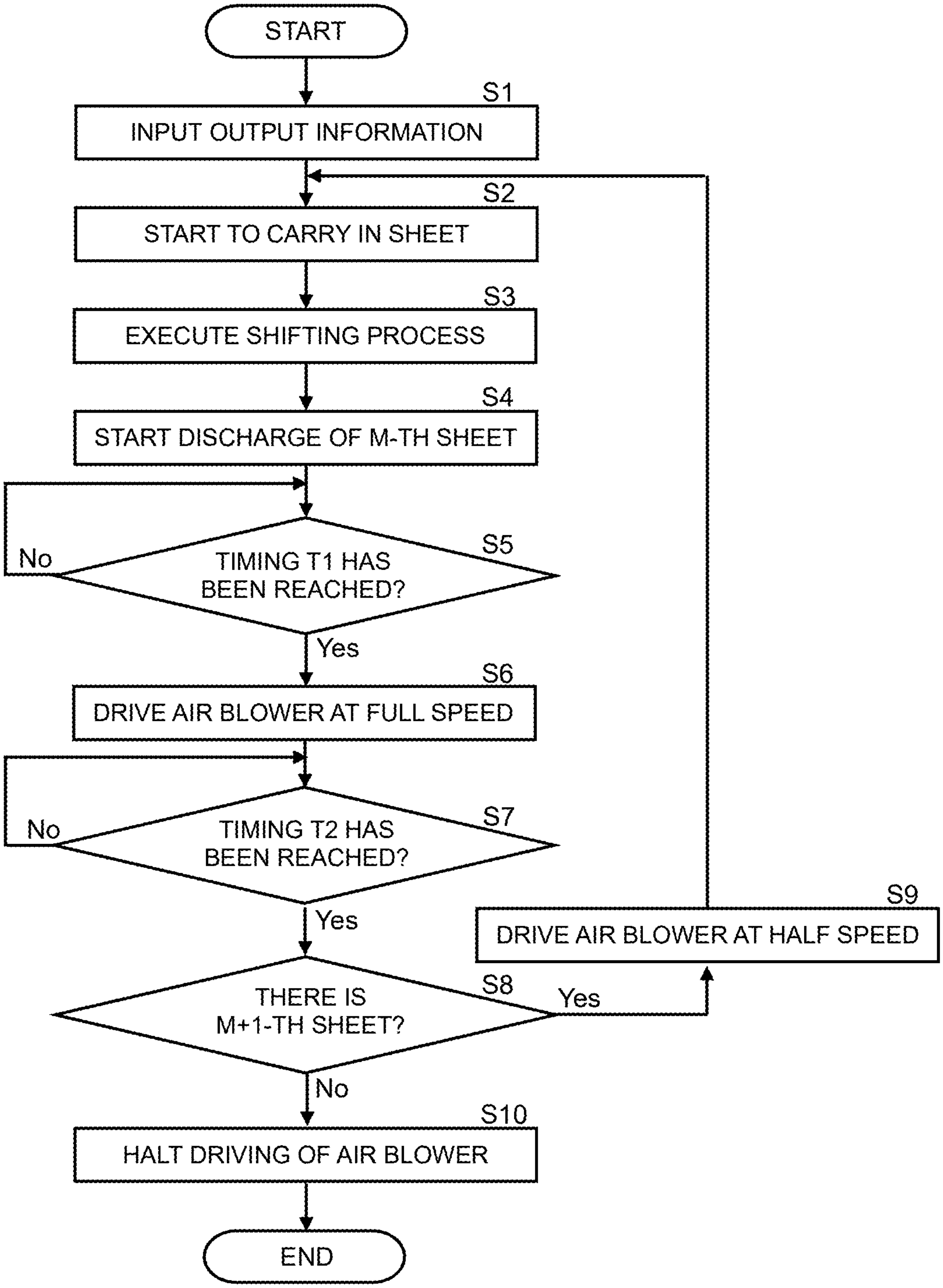
FIG. 7 is a flow chart showing an example of drive control of an air blower during sheet discharge in the sheet post-processing device according to the embodiment.

FIG. 7 is a flow chart showing an example of drive control of the air blower 45 during sheet discharge to the first sheet discharge portion 4 in the sheet post-processing device 1 according to this embodiment. With reference to FIGS. 1 to 6 as necessary, a description is given, in accordance with steps shown in FIG. 7, of drive control of the air blower 45 during discharge of the sheet S to the first sheet discharge portion 4. FIG. 7 illustrates a case where n (n: natural number) sheets S are subjected to the shifting process and discharged to the first discharge tray 43.

When a command to perform the shifting process on the sheet S is inputted from the main body control portion 203 (see FIG. 1) in the image forming apparatus 200, together with the shifting process command, output information on the sheet S is inputted (step S1). The output information on the sheet S includes the size of the sheet S, the number of sheets S to be outputted, and so on.

The post-processing control portion 10 starts to carry, onto the processing tray 521, the sheet S that has been carried into the sheet post-processing device 1 via the sheet carry-in inlet 2 (step S2). Specifically, upon the sheet sensor 48 sensing that the trailing end of the sheet S has passed through the carry-in roller pair 54, the post-processing control portion 10 performs control so that, by the tapping member 53, the sheet S is tapped at the trailing end thereof so as to be aligned along the processing tray 521, and then the alignment paddle 57 moves to the acting position and contacts the upper surface of the sheet S.

When the alignment paddle 57 is rotated in this state, the sheet S is drawn in the alignment direction (the direction of the arrow A') along the processing tray 521. Furthermore, at the same time, there is also performed the shifting process by the width regulation member 523 (see FIG. 4) (step S3). After that, the sheet S is sent further downstream in the alignment direction by the alignment paddle 57 and aligned in the carry-in direction by the reference plate 73, thus being loaded in that state.

Next, the post-processing control portion 10 controls the lower discharge roller 421 and the upper discharge roller 422 (see FIG. 4) to contact each other so as to form the nip of the first discharge roller pair 42 and the first discharge roller pair 42 to rotate in the discharge direction. In this way, discharge of an m-th (1≤m≤n) sheet S that has been subjected to the shifting process to the first discharge tray 43 (see FIG. 3) is started (step S4).

Next, the post-processing control portion 10 determines whether or not the timing T1 when the leading end of the sheet S contacts the first discharge tray 43 (or the sheet S loaded on the first discharge tray 43) has been reached (step S5). In a case where the timing T1 has been reached, the air blower 45 is driven at a full speed (step S6). Specifically, the post-processing control portion 10 sets a duty cycle of an alternating-current voltage applied to the air blower 45 to 100%.

Next, the post-processing control portion 10 determines whether or not the timing T2 when the trailing end of the sheet S contacts the first discharge tray 43 (or the sheet S loaded on the first discharge tray 43) has been reached (step S7). In a case where the timing T2 has been reached, the post-processing control portion 10 determines whether or not m+1≤n (step S8).

In a case where m+1≤n (Yes at step S8), there exists an m+1-th sheet S, and thus after the earlier described timing T2 has been reached, the air blower 45 is driven at a half speed (a ½ speed) (step S9). Specifically, the post-processing control portion 10 sets the duty cycle of the alternating-current voltage applied to the air blower 45 to 50%. Further, a return is made to step S2, at and after which the m+1-th sheet S is carried in, the shifting process is executed thereon, the sheet S is discharged to the first discharge tray 43, it is determined whether or not the timing T1 has been reached, the air blower 45 is driven at the full speed, and it is determined whether or not the timing T2 has been reached (steps S2 to S7).

On the other hand, in a case where m+1>n at step S8 (No at step S8), there exists no m+1-th sheet S (the sheet S discharged this time is an n-th sheet S), and thus after the earlier described timing T2 has been reached, driving of the air blower 45 is halted (step S10) to end the process.

According to the control example shown in FIG. 7, the air blowing mechanism 44 blows an air flow to the sheet S being discharged to the first sheet discharge portion 4, and thus it is possible to stably load the sheet S on the first discharge tray 43 while suppressing curling of the sheet S at both the ends thereof in the width direction.

Furthermore, in a case of continuously discharging the sheet S, the air blower 45 is driven at the full speed (the first speed) during discharge of the sheet S and at the half speed (the second speed) during the period (the inter-sheet interval) until a succeeding sheet S is discharged through the first discharge outlet 41. Thus, an air velocity of an air flow from the air blower 45 can be stably increased to a full velocity in accordance with a timing of discharging the succeeding sheet S. Furthermore, during the period until the succeeding sheet S is discharged, the air blower 45 is driven at the half speed, and thus it is also possible to suppress fluttering of the succeeding sheet S at the leading end thereof in the discharge direction.

While the foregoing has described the embodiment of the present disclosure, the present disclosure is not limited in scope thereto and can be implemented in variously modified forms without departing from the spirit of the disclosure. For example, while in the foregoing embodiment, a pair of air blowing mechanisms 44 is arranged at a middle in the sheet width direction, for example, as shown in FIG. 8, two pairs of air blowing mechanisms 44 may be arranged at positions line-symmetrical with respect to the middle in the sheet width direction as a symmetrical axis.

Figure 8:
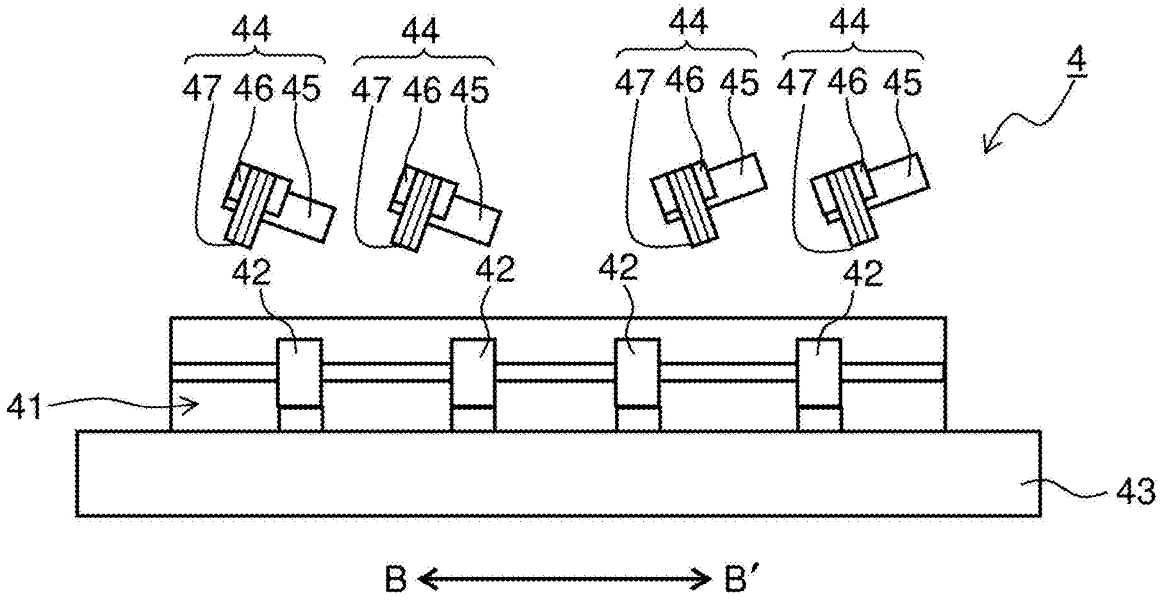
FIG. 8 is a view showing an example in which two pairs of air blowing mechanisms are arranged at positions line-symmetrical with respect to a middle in a sheet width direction as a symmetrical axis.

With the configuration shown in FIG. 8, the air blowing mechanisms 44 can be selectively used depending on the size, in the width direction, of the sheet S loaded on the processing tray 521. Accordingly, even in a case of discharging the sheets S largely different in size in the width direction, it is possible to reliably blow an air flow to each of both the ends of the sheet S in the width direction. Three or more pairs of air blowing mechanisms 44 may be arranged at positions line-symmetrical with respect to the middle in the sheet width direction as a symmetrical axis.

Furthermore, while in the foregoing embodiment, the air blower 45 and the air blowing port 47 are connected to each other via the air blowing duct 46, a configuration may be adopted in which the air blowing duct 46 is not provided, and the air blower 45 and the air blowing port 47 are directly connected to each other.

Furthermore, while the foregoing embodiment exemplarily uses, as the sheet discharger according to the present disclosure, the first sheet discharge portion 4 to which the sheets S that have been loaded on the processing tray 521 and subjected to the binding process by the sheet binding unit 92 are discharged, the present disclosure is not limited thereto and may be applied also to the second sheet discharge portion 6.

Furthermore, while the foregoing embodiment exemplarily uses an inkjet recording apparatus as the image forming apparatus 200, a printer or a copy machine based on an electrophotographic method can also be used as the image forming apparatus 200. In an inkjet recording method in which ink is ejected to a sheet, the sheet is more likely to be curled than in the electrophotographic method. The present disclosure is, therefore, particularly useful for the sheet post-processing device 1 to which an inkjet recording apparatus is connected as the image forming apparatus 200.

Furthermore, while the foregoing embodiment exemplarily uses, as the sheet discharger according to the present disclosure, the first sheet discharge portion 4 in the sheet post-processing device 1 connected to the image forming apparatus 200, the sheet discharger according to the present disclosure is applicable also to a sheet discharge portion in the image forming apparatus 200 used without being connected to the sheet post-processing device 1.

The present disclosure is usable in a sheet discharger that discharges a sheet, and a sheet post-processing device and an image forming apparatus each including the sheet discharger.

What is claimed is:

1. A sheet discharger, comprising:
- a sheet discharge outlet through which a sheet is discharged;
- a discharge member that is arranged at the sheet discharge outlet and conveys the sheet in a discharge direction;
- a sheet discharge tray that is arranged downstream of the sheet discharge outlet in the discharge direction and on which the sheet discharged through the sheet discharge outlet is loaded; and
- an air blowing mechanism that blows an air flow to the sheet discharged through the sheet discharge outlet,
- wherein
- the air blowing mechanism includes:
  - an air blowing port for blowing the air flow from upward to the sheet discharged through the sheet discharge outlet; and
  - an air blower that is connected to the air blowing port and generates the air flow,
- the air blowing port is provided above the sheet discharge outlet, at least a pair of air blowing ports is arranged at a middle in a width direction of the sheet orthogonal to the discharge direction, and the air flow is blown through the air blowing port diagonally downward from inside toward outside in the width direction of the sheet,
- the sheet discharger further comprises:
  - a control portion that controls the air blower; and
    - a sheet sensor that senses passing of a leading end of the sheet,
  - based on a sensing timing of sensing the leading end of the sheet transmitted from the sheet sensor and a time period that has elapsed from the sensing timing, the control portion detects respective timings when the leading end and a trailing end of the sheet contact the sheet discharge tray or a sheet loaded on the sheet discharge tray, and
  - the control portion performs control so that
    - at or after the timing when the leading end of the sheet contacts the sheet discharge tray or a sheet loaded on the sheet discharge tray, the air blower starts blowing of the air flow, and
    - at the timing when the trailing end of the sheet contacts the sheet discharge tray or the sheet loaded on the sheet discharge tray, the air blower halts the blowing of the air flow.

2. The sheet discharger according to claim 1,
- wherein in a case of continuously discharging the sheet through the sheet discharge outlet, the control portion performs control so that
  - during discharge of the sheet through the sheet discharge outlet, the air blower is driven at a first speed, and
  - during a period after the discharge of the sheet through the sheet discharge outlet until a succeeding sheet is discharged through the sheet discharge outlet, the air blower is driven at a second speed lower than the first speed.

3. A sheet discharger, comprising:
- a sheet discharge outlet through which a sheet is discharged;
- a discharge member that is arranged at the sheet discharge outlet and conveys the sheet in a discharge direction;
- a sheet discharge tray that is arranged downstream of the sheet discharge outlet in the discharge direction and on which the sheet discharged through the sheet discharge outlet is loaded; and
- an air blowing mechanism that blows an air flow to the sheet discharged through the sheet discharge outlet,
- wherein
- the air blowing mechanism includes:
  - an air blowing port for blowing the air flow from upward to the sheet discharged through the sheet discharge outlet; and
  - an air blower that is connected to the air blowing port and generates the air flow,
- the air blowing port is provided above the sheet discharge outlet, at least a pair of air blowing ports is arranged at a middle in a width direction of the sheet orthogonal to the discharge direction, and the air flow is blown through the air blowing port diagonally downward from inside toward outside in the width direction of the sheet,
- the sheet discharger further comprises:
  - a control portion that controls the air blower; and
  - a sheet sensor that senses passing of a leading end of the sheet,
- based on a sensing timing of sensing the leading end of the sheet transmitted from the sheet sensor and a time period that has elapsed from the sensing timing, the control portion detects respective timings when the leading end and a trailing end of the sheet contact the sheet discharge tray or a sheet loaded on the sheet discharge tray,
- in a case of continuously discharging the sheet through the sheet discharge outlet, the control portion performs control so that
  - during discharge of the sheet through the sheet discharge outlet, the air blower is driven at a first speed, and
  - during a period after the discharge of the sheet through the sheet discharge outlet until a succeeding sheet is discharged through the sheet discharge outlet the air blower is driven at a second speed lower than the first speed,
- in a case of continuously discharging n sheets through the sheet discharge outlet, the control portion performs an operation in which at or after a timing when a leading end of an m-th ($1 \leq m < n$) sheet contacts the sheet discharge tray or an m−1-th sheet loaded on the sheet discharge tray, the air blower is driven at the first speed, at a timing when a trailing end of the m-th sheet contacts the sheet discharge tray or the m−1-th sheet loaded on the sheet discharge tray, the air blower is switched to be driven at the second speed, and at or after a timing when a leading end of an m+1-th sheet contacts the m-th sheet loaded on the sheet discharge tray, the air blower is switched back to be driven at the first speed, the operation being repeatedly performed until m+1=n, and at a timing when a trailing end of an n-th sheet contacts an n−1-th sheet loaded on the sheet discharge tray, the control portion halts driving of the air blower.

4. The sheet discharger according to claim 1, wherein when a vertical direction is taken as 0 degrees, a blowing angle of the air flow blown through the air blowing port is 15° to 20°.

5. The sheet discharger according to claim 1, wherein a blowing angle of the air flow blown through the air blowing port is adjustable.

6. The sheet discharger according to claim 1, wherein a plurality of air blowing ports are arranged on both sides with respect to the middle in the width direction of the sheet.

7. A sheet post-processing device, comprising:

a post-processing section that performs a prescribed type of post-processing on a sheet; and the sheet discharger according to claim 1 that discharges the sheet that has been subjected to the prescribed type of post-processing by the post-processing section.

8. An image forming system, comprising:

an image forming apparatus that forms an image on a sheet; and the sheet post-processing device according to claim 7 that performs the prescribed type of post-processing on the sheet on which the image has been formed by the image forming apparatus.

9. The image forming system according to claim 8, wherein the image forming apparatus is an inkjet recording apparatus that performs image recording by ejecting ink to the sheet.

10. An image forming apparatus, comprising:

an image forming portion that forms an image on the sheet; and the sheet discharger according to claim 1 that discharges the sheet on which the image has been formed by the image forming portion.

11. The image forming apparatus according to claim 10, wherein the image forming portion performs image recording by ejecting ink to the sheet.

* * * * *